(12) United States Patent
Frodigh et al.

(10) Patent No.: US 6,246,877 B1
(45) Date of Patent: Jun. 12, 2001

(54) METHOD AND SYSTEM IN A MOBILE RADIO SYSTEM

(75) Inventors: Magnus Frodigh; Magnus Almgren, both of Sollentuna; Håkan Olofsson, Stockholm, all of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/134,027

(22) Filed: Aug. 14, 1998

(30) Foreign Application Priority Data

Aug. 15, 1997 (SE) .................................................. 9702952

(51) Int. Cl.⁷ ................................. H04Q 7/22; H04Q 7/20
(52) U.S. Cl. ........................ 455/436; 455/440; 455/442; 455/525; 370/331; 370/332
(58) Field of Search ..................................... 455/436, 440, 455/437, 438, 443, 442; 370/331, 332, 333, 252

(56) References Cited

U.S. PATENT DOCUMENTS

| 4,718,081 | 1/1988 | Brenig ..................................... 379/60 |
| 5,170,485 | 12/1992 | Levine et al. ........................ 455/33.2 |
| 5,239,667 | * 8/1993 | Kanai ..................................... 455/10 |
| 5,379,446 | * 1/1995 | Murase ................................. 455/426 |
| 5,432,842 | 7/1995 | Kinoshita et al. ..................... 379/60 |
| 5,436,956 | 7/1995 | Shiotsuki et al. ...................... 379/60 |
| 5,590,126 | 12/1996 | Mishra et al. ........................ 370/329 |
| 5,678,185 | * 10/1997 | Chia ...................................... 455/437 |
| 5,701,585 | * 12/1997 | Kallin et al. .......................... 455/437 |
| 5,722,072 | * 2/1998 | Crichton et al. ...................... 455/437 |
| 5,722,073 | * 2/1998 | Wallstedt et al. ..................... 455/437 |
| 5,774,809 | * 6/1998 | Tuutijarvi et al. .................... 455/437 |
| 5,822,696 | * 10/1998 | Bergkvist ............................. 455/436 |

FOREIGN PATENT DOCUMENTS

WO9326100 A1 12/1993 (WO) .

OTHER PUBLICATIONS

Silfverling, Jan; *PCT International–Type Search Report*, May 12, 1998, Search request No. SE 97/01060, pp. 1–3.
U.S. application No. 08/609,422.

* cited by examiner

*Primary Examiner*—Lee Nguyen
*Assistant Examiner*—Simon Nguyen
(74) *Attorney, Agent, or Firm*—Jenkens & Gilchrist P.C.

(57) ABSTRACT

The invention relates to a method of performing handover in a mobile radio system. The mobile radio system performs quality measurements on signals transmitted (300) between a mobile terminal and predetermined radio base stations. Handover is performed (301, 302, 303) when some of the measured signal strengths exceeds the signal strength for the radio base station to which the mobile terminal for the moment is set up, added to a handover value. The handover value is dependent on measured signal strengths and neighboring cell relation values. The neighboring cell relation values depend on a probability for handover to be performed from one radio base station to another radio base station in the mobile radio system.

18 Claims, 2 Drawing Sheets

METHOD AND SYSTEM IN A MOBILE RADIO SYSTEM

TECHNICAL FIELD

The invention relates to a mobile radio system which comprises radio base stations to transfer control information and message information in the form of radio information to mobile terminals. The invention particularly relates to a method in which the transmission of message information to a mobile terminal is handed over from one radio base station to another radio base station, i.e. a so called handover.

BACKGROUND OF THE INVENTION

It is desirable that a mobile radio system has a large traffic handling capacity and a high degree of coverage. The traffic handling capacity for a mobile radio system depends i.a. on the number of available radio channels and how effectively these channels can be utilized. It is known to provide several radio base stations having small coverage areas, also called cells, close to each other within a mobile radio system. Then, available radio channels can be utilized in a more efficient manner for handling traffic peaks within a restricted geographical area than if radio base stations having large coverage areas are arranged far from each other within the mobile radio system. The coverage area is the area within which a call is established. Thus, the provision of many radio base stations close to each other can increase the capacity in a mobile radio system. Two radio base stations with such overlapping coverage areas can not however normally use the same radio channel for communication with different mobile terminals which is true for e.g. mobile radio systems implemented in TDMA technology and FDMA technology.

When a mobile terminal has a communication link established to a first radio base station (below also called active radio base station and its associated cell is in analogy herewith called an active cell) and moves from the area that is covered by said first radio base station to another area which is covered by a second radio base station, a new communication link has to be established between the mobile terminal and the second radio base station. This is automatically controlled by the mobile radio system and the method is denoted handover or hand-off.

Comparatively much signaling is required in the mobile radio system in connection with handover. This means that the radio system is loaded every time handover is to be performed. Therefore, it is desirable to avoid having to perform unnecessary handovers.

Due to the presence of radio shadows caused e.g. by variations in the terrain, there can be islands in a cell belonging to one radio base station where the radio signal of the radio base station of another cell is stronger. If enough signal strength can be offered without handover being performed to such an island, it is disadvantageous to perform such a handover. If handover is avoided to said islands, the signaling in a radio system is reduced and thereby a lower load on the mobile radio system is obtained.

In U.S. Pat. No. 4,718,081 an apparatus and a method are described for performing handovers. The object of the method is to avoid performing handovers to radio base stations which would not be optimal to perform handovers too. Signal strength measurement is carried out on handover candidate radio base stations and their neighbouring radio base stations. Candidate radio base stations are the radio base stations to which it is possible for a mobile to perform a handover to if needed. Neighbouring cells to a cell are the cells that surround this cell. A calculation of a weighted average value of measured signal strength for candidate radio base station and its neighbouring radio base stations is carried out for all candidate radio base stations. The signal strength of the neighbouring radio base stations are multiplied by a weight factor preferably equal to 0.5 in the calculation. The calculated weighted average values for the candidate radio base stations are compared. The radio base station having the highest weighted average value is selected to handle an ongoing call.

BRIEF DESCRIPTION OF THE INVENTION

The present invention is based on the insight that, by taking into consideration how a second radio base station that possibly will take over a mobile call (handover) from a first radio base station, is related to the (other) radio base stations that are neighbouring base stations to said first base station, it is possible to avoid unnecessary handovers when an island is present that is so located that it is not suitable to perform handover to the base station that has given rise to this island.

An object of the present invention is, thus, to avoid handovers in areas where radio communication signals are received with high signal strength (or where any other signal quality measure that is used to judge when handover is to take place, has a high value) from a radio base station that is far from said areas. Fewer handovers reduce the load on the radio system and also the risk for ongoing calls to be cleared down. This also leads to the result that the system will be less exposed to disturbances since the number of mobile terminals that are set up to the base station and that at the same time are far from the radio base station, is reduced.

This is attained by the present invention in that handover of a mobile terminal is performed from a first radio base station to a second radio base station when a first quality value, corresponding to a measured quality measure of a radio signal that has been transferred between the second radio base station and the mobile terminal, exceeds the same quality measure of the signal from the first radio base station added to a handover value that is dependent on a measured quality value of a radio signal that has been transferred between a further radio base station and the mobile terminal and a value on a neighbouring cell relation (below called relation value).

An advantage of the present invention is that the number of handovers in the mobile radio system on an average is reduced which reduces the load on the mobile radio system.

The invention will now be described more in detail by means of preferred embodiments with reference to the appended drawings.

PREFERRED EMBODIMENTS

Figure 1:
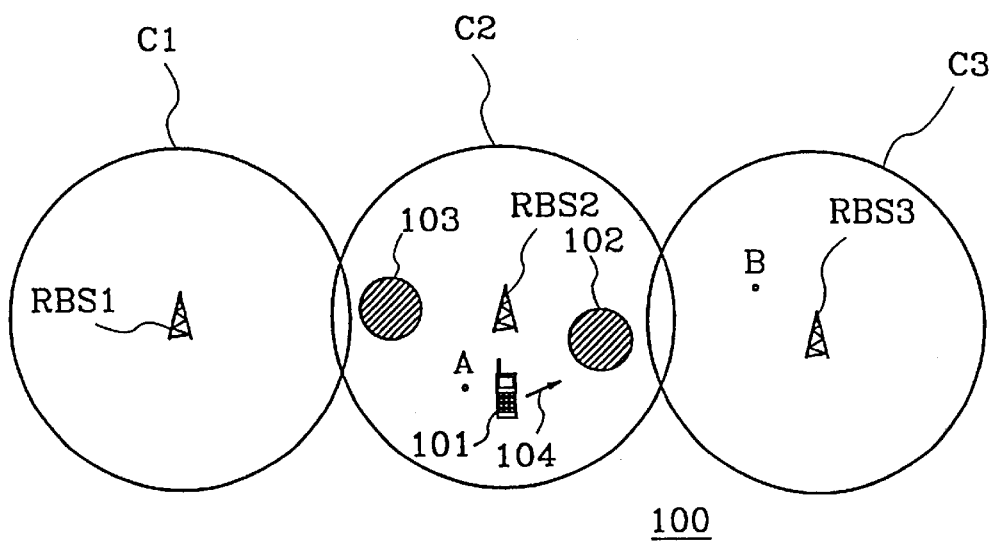
FIG. 1 shows a mobile radio system designed with three cells.

In FIG. 1, a mobile radio system is shown, comprising mobile terminals and radio base stations having transmitters and receivers for radio signals. For reason of simplicity, only one mobile terminal 101 is shown. When the quality on a connection link between a radio base station and a mobile terminal is below a predetermined value, the mobile radio system has the possibility of assigning a new connection link between another radio base station and the mobile terminal 101. This can be carried out e.g. during an ongoing call and is called handover or hand-off.

By means of FIG. 1, a handover method in accordance with the present invention will be explained, which method aims at avoiding situations wherein calls are handed over to a radio base station that in an area (island) certainly has a high signal quality value but that for some reason still is not suitable to be the radio base station that handles the call. Said areas are islands in cells where radio signals are received with higher quality from a radio base station that is located outside and comparatively far from the area where the island in question is located.

To clarify the explanation of the present invention, a known handover method will also be described with reference to FIG. 1.

FIG. 1 shows a mobile radio system 100 which comprises three radio base stations RBS1, RBS2, RBS3. The radio base station RBS1 has an associated cell C1, the radio base station RBS2 has a cell C2, and the radio base station RBS3 has a cell C3. Due to e.g. terrain variations, a first island 102 is formed in the cell C2, where there are better transmission and reception conditions for a mobile terminal 101 relative to the radio base station RBS1 than to the radio base station RBS2 despite the fact that the latter radio base station RBS2 is located closer to said first island 102.

When the mobile terminal 101 moves from its present position A in a direction 104 towards a position B, the mobile terminal 101 gradually enters the first island 102. When passing into the first island 102, in a known method, a handover is performed to the radio base station RBS1 in view of better transmission and reception conditions for the mobile terminal 101 relative to this radio base station RBS1 than to the radio base station RBS2. The mobile terminal 101 moves further on in the direction 104, leaves the first island 102 and again enters into the area of the cell C2 where there are better reception conditions relative to RBS2 wherein handover to this base station is performed. When the mobile terminal 101 passes into the cell C3, handover to the radio base station RBS3 is performed.

Handover causes a load on the mobile radio system due to the fact that is requires comparatively much signaling. By utilizing the present invention to avoid handover to islands of the type described above, i.e. to islands that are far away from the radio base station that has given rise to the respective island, the load on the system will be reduced. Since each handover also constitutes an increased risk of losing an on-going call, also this risk will be reduced by the present invention. The interference and the path loss can drastically increase when a mobile terminal is set up to a radio base station which is located far away therefrom and since this is avoided by means of the present invention, further advantages will thus be obtained.

There is a further island 103 that is closer to the radio base station RBS2 than RBS1 but in which there are better transmission and reception conditions with the radio base station RBS1 than with the radio base station RBS2. However, this island is comparatively close to the radio base station RBS1 (in comparison with the island 102) and when the mobile terminal 101 enters this second island 103, a handover to the radio base station RBS1 is performed also when utilizing a preferred embodiment of the present invention. This type of handover is performed by the present invention in view of the nearness of the island to the radio base station from which the island originates.

The quality measure that a mobile radio system utilizes to be able to decide whether or not to perform a handover can be of many different kinds but the most common are: signal strength, bit error rate and signal/interference ratio (C/I). To facilitate the description, in the following, reference will only be made to a preferred case where signal strength is used as quality measure, but anyone skilled in the art realizes that there can be a large number of different quality measures that can be used in connection with the present invention without in any respect changing the basic conditions for the present invention. When the mobile terminal 101 is in contact with the mobile radio system 100, it carries out signal strength measurements on signals that are transferred between the mobile terminal 101 and all radio base stations RBS1, RBS3 that are listed in a neighbouring cell list assigned to the mobile terminal 101, and between the mobile terminal 101 and the radio base station RBS2 that forms the active cell for the mobile terminal 101. Radio base stations in the neighbouring cell list are called neighbouring radio base stations or neighbouring cells. If e.g. the cell C2 is active cell for the mobile terminal 101, the cells C1, C3 are listed in said neighbouring cell list as candidates for handover. In a digital mobile radio system, the signal strength measurement is carried out e.g. with respect to the neighbouring cells by the mobile terminal on radio signals transmitted from the radio base stations, i.e. on downlink signals, and for the active cell of the mobile terminal the measurement is carried out by the radio base station in the active cell on radio signals transmitted form the mobile terminal, i.e. on the uplink signal. The measured signal strengths obtained in the mobile terminal 101 are transferred by the mobile terminal to the mobile radio system via the radio base station of the active cell. Thus, the mobile radio system has information about all signal strengths for the radio base stations that are candidates for handover of the mobile terminal 101. In an analog mobile radio system, the system obtains corresponding signal strengths by measuring the signal strength from the mobile terminal to all radio base stations, i.e. on uplink signals, that are listed in the neighbouring cell list. The present invention is not dependent on how the measurement of the signal strengths is carried out but only on that it is carried out.

A known algorithm to evaluate the signal strength and arrive at a decision about a possible handover to a certain candidate cell is to compare the signal strength for the candidate cell with the signal strength for the active cell added to a hysteresis value as follows: $SS_{cand} \geq SS_{active} + hyst_1$. Said signal strengths are measured e.g. in decibel in relation to 1 mW, i.e. that the unit of the measured signal strengths is dBm. The comparison is carried out at regular intervals for all candidate cells. A hysteresis value $hyst_1$ is utilized to avoid performing handover back and forth between two radio base stations when a mobile terminal moves along the border between the two cells in question. Then, handover is performed when the mobile terminal for sure is located inside the candidate cell and probably will not directly need to perform handover back to the previously used radio base station. For the mobile radio system 100 where the cell C3, is active cell, and C1 and C2, respectively, are neighbouring cells to C2 and thus handover candidates, at the signal strength measurement, the signal strengths $SS_{C1}$, $SS_{C2}$, $SS_{C3}$ are obtained. Each signal strength originates from the respective radio base station RBS1, RBS2, RBS3. With these measured signal strengths, the following comparisons are carried out: $SS_{C1} \geq SS_{C2} + hyst_1$ and $SS_{C3} \geq SS_{C2} + hyst_1$, at regular intervals to decide about a possible handover.

In accordance with the present invention, a handover value is considered according to $SS_{cand} \geq SS_{active}$+handover value. The handover value is a value which essentially is dependent on the measured signal strengths from the different candidate radio base stations and the relations values between the candidate cells. The dependence is such that high signal strength values and low relation values increases the handover value and thereby puts more refined requirements on the signal strength transmitted by the candidate radio base station in order for handover to be performed than what is the case in accordance with the prior art. In an embodiment of the invention, the hysteresis value $hyst_1$ known as above can be added.

Now, the term neighbouring cell relation will be briefly explained. The neighbouring cell relation is a value which is dependent on the probability for a handover to be performed between two radio base stations. This probability can e.g. be defined as the average number of handovers performed during a certain period of time, that e.g. can be twenty-four hours or a month. This value can change when the number of handovers performed from a first radio base station to a second radio base station during the specific time period, changes. The probability for a handover to be performed from the first radio base station to the second radio base station does not have to be equal to the probability for a handover to be performed from the second radio base station to the first radio base station. A high value corresponds to a high probability for handover between two radio base stations, i.e. many handovers have been performed earlier between these radio base stations, and a low value corresponds to a low probability for handover to be performed. Neighbouring cell relation values can e.g. be summed up in a matrix Q in the following manner for the mobile radio system 100 shown in FIG. 1:

$$Q_3 = \begin{bmatrix} \cdots & q_{12} & q_{13} \\ q_{21} & \cdots & q_{23} \\ q_{31} & q_{32} & \cdots \end{bmatrix}.$$

Each element in a row in the matrix $Q_3$ corresponds to the probability for handover from a radio base station to any other radio base station in the mobile radio system 100. In e.g. row 2 in the matrix $Q_3$, a first neighbouring cell relation value $q_{21}$ corresponds to the probability for handover to be performed from the radio base station RBS2 to the radio base station RBS1, and a second neighbouring cell relation value $q_{23}$ corresponds to the probability for a handover to be performed from the radio base station RBS2 to the radio base station RBS3. A neighbouring cell relation value $q_{32}$ in row 3 which corresponds to the probability for a handover to be performed from the radio base station RBS3 to the radio base station RBS2 is not necessarily as high as the neighbouring cell relation value $q_{23}$. For some reason, more handovers can e.g. have been performed from the radio base station RBS2 to the radio base station RBS3 than in the opposite direction.

For a mobile radio system with n radio base stations, the probability for handover between all the radio base stations of the mobile radio system is described by the following matrix:

$$Q_n = \begin{bmatrix} \cdots & q_{12} & \cdots & q_{1n} \\ q_{21} & \cdots & \cdots & \cdots \\ \vdots & \vdots & \vdots & \vdots \\ q_{nl} & \cdots & \cdots & \cdots \end{bmatrix}.$$

The values in the matrix $Q_n$ can be utilized in different ways, one way being to convert the matrix into a matrix Q' where the values are calculated as follows:

$$q'_{ij} = a q_{ij} + (1-a) q_{ji}, \text{ where } 0 \leq a \leq 1.$$

The definition of relation value as indicated above is merely an example of a possible relation value since there is a large number of different definitions of relation value that can used without affecting the basis for the present invention. Neither is it necessary to describe the relations in the form of a matrix but other descriptions can be used.

Another way to determine the relation values is to utilize the geometric relationship between the different radio base stations. The simplest possible case is simply measuring the distance between the different radio base stations and using this distance as a starting point for calculating the relation value. There are of course a larger number of different ways of determining the relation values by utilizing the geometry of the system, which should be obvious to anyone skilled in the art when reading the present patent application. Different ways of calculating the relation values can of course give rise to different values thereon.

Another way of measuring neighbouring association is that the mobile radio system calculates the attenuation of radio signals received by the mobile terminal, that have been transmitted from the radio base stations. The attenuation is defined as the quotient between the power of a received radio signal and the power transmitted by the radio base station. Then, the inverse of the attenuation is compared. If a mobile receives radio signals where the inverse of the attenuation is large for two compared radio signals, it is probable that these two are neighbours. By deciding that there is a neighbouring relation between two radio base stations when the inverse of the attenuation of two radio signals transmitted from said radio base stations exceeds e.g. 80 dB, a measure on neighbouring cell relations is obtained in analogy with the above, and a $Q_n$ matrix as above can be formed.

Neighbouring cell relations as a term has been proposed and described in U.S. patent application Ser. No. 08/609, 422, which is hereby incorporated by reference herein in its entirety, and PCT application PCT/SE97/00328.

The relation values can also be defined as being constant, i.e. fixed to certain values.

A method in accordance with the present invention will now be described more in detail by means of an exemplifying embodiment. In the example, it is supposed that the active cell is cell C2. When the mobile terminal 101 is in contact with the mobile radio system 100 and is located in the cell C2, signal strength measurements are thus carried out between the radio base stations RBS1, RBS2, RBS3 and the mobile terminal 101 and the signal strengths are compared in accordance with: $SS_{C1} \geq SS_{C2} + hyst_1 +$ handover value and $SS_{C3} \geq SS_{C2} + hyst_1 +$ handover value. For reason of simplicity, the comparison of signal strengths is explained merely by analyzing the inequality: $SS_{C1} \geq SS_{C2} + hyst_1 +$ handover value when the mobile 101 approaches the first island 102.

When the mobile terminal 101 is present in the cell C2, the handover value in the inequality $SS_{C1} \geq SS_{C2} + hyst_1 +$ handover value depends on a quotient $$\frac{SS_{C3}}{q_{31}}$$

where $SS_{C3}$ is the signal strength from the radio base station RBS3 and $q_{31}$ is the neighbouring cell relation between the cell C3 and the cell C1, i.e. the probability for a handover to be performed from the radio base station RBS3 to the radio base station RBS1.

Suppose that the mobile terminal 101 approaches the first island 102. The quotient $$\frac{SS_{C3}}{q_{31}}$$

will be comparatively high since $SS_{C3}$ has a comparatively high value and $q_{31}$ has a comparatively low value. Thereby, the handover value will be comparatively high due to the fact that the quotient $$\frac{SS_{C3}}{q_{31}}$$

is comparatively high. Since the handover value is high, no handover to the radio base station RBS1 will be performed when the mobile terminal moves into the first island 102.

When the same mobile terminal 101 is at the border of the second island 103, also in this case, it is the inequality $SS_{CD1} \geq SS_{C2} + hyst_1 +$ handover value that decides whether a possible handover is to be performed. The handover value is also now determined by the quotient $$\frac{SS_{C3}}{q_{31}}.$$

Since the signal strength $SS_{C3}$ from the radio base station RBS3 in this case has a low measured value and even if the relation value $q_{31}$ is comparatively low, the handover value will be comparatively low. Thus, a handover is performed to the radio base station RBS1 when the mobile terminal moves into the second island 103. The reasoning for the value of the handover value is analogous for situations when the mobile terminal 101 moves into the cell C1 or the cell C3.

Figure 2:
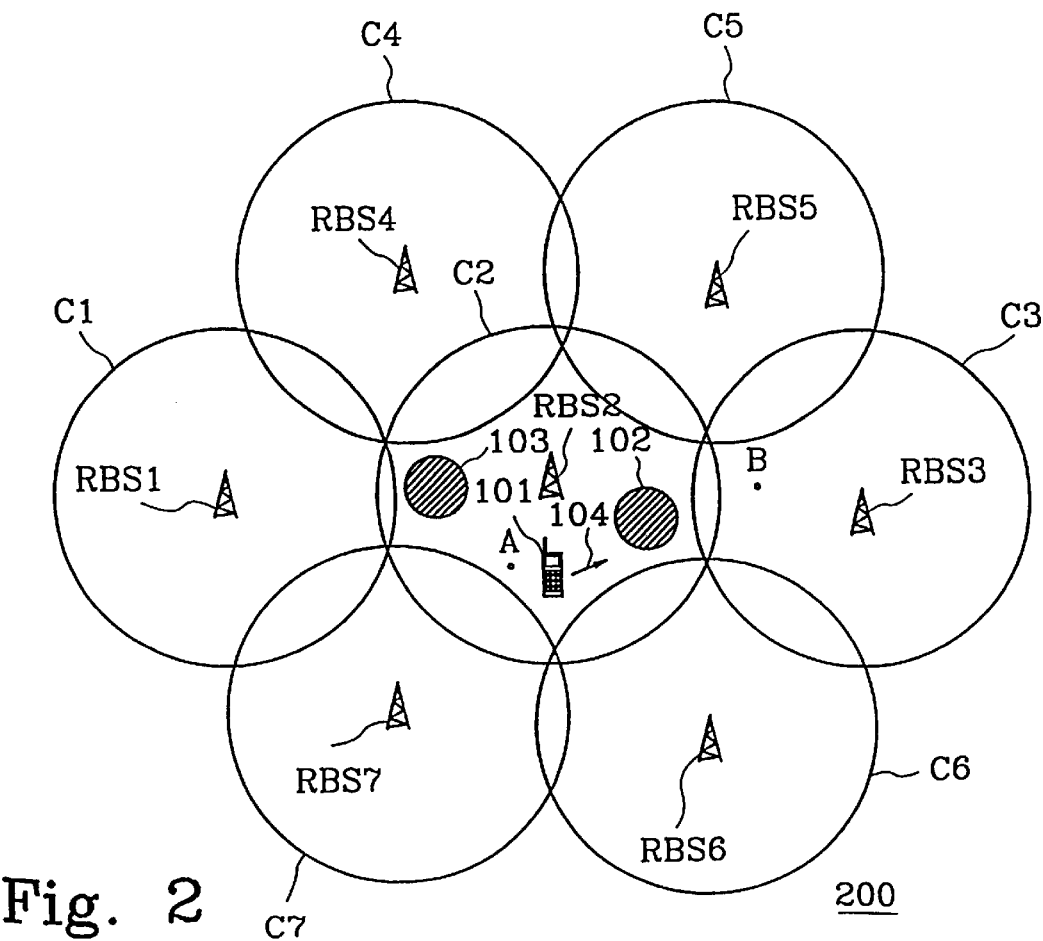
FIG. 2 shows a mobile radio system.

FIG. 2 shows a part 200 of a mobile radio system in conformity with FIG. 1. FIG. 2 shows a cell C2 having six neighbouring cells C1, C3, C4, C5, C6, C7. Each cell has a respective radio base station RBS1, RBS2, RBS3, RBS4, RBS5, RBS6, RBS7 each intended for the radio communication in a corresponding cell. For reason of simplicity, so called omnicells are shown. It is obvious that the present invention is also applicable to mobile radio systems having so called sector cells.

When the mobile terminal 101 is present in the cell C2, in the analysis to determine whether a possible handover is to be performed, all measured signal strengths $SS_{C1}$, $SS_{C2}$, $SS_{C3}$, $SS_{C4}$, $SS_{C5}$, $SS_{C6}$, $SS_{C7}$, and all corresponding neighbouring cell relations are taken into consideration.

As an example, it shall now be shown how the analysis is carried out when the mobile terminal 101 passes into the first island 102 in the cell C2. The inequality $SS_{C1} \geq SS_{C2} + hyst_1 +$ handover value is in this scenario the condition that has to be fulfilled in order for a handover to be performed to the radio base station RBS1. When calculating the handover value, the following quotients between signal strengths and relation values are taken into consideration:

$$\frac{SS_{C3}}{q_{31}}, \frac{SS_{C4}}{q_{41}}, \frac{SS_{C5}}{q_{51}}, \frac{SS_{C6}}{q_{61}} \text{ and } \frac{SS_{C7}}{q_{71}}.$$

The reasoning above what concerns the size of the quotients in the mobile radio system 100, is valid also in this connection.

In order to get a well defined and controllable area within which the quotients mentioned above correspond to a value, a so called saturation function is used. An example of such a function is a tangent hyperbolicus function and then, e.g. the following can be used:

$$f_1(SS, q) = \left(\frac{1}{2} + \frac{1}{2} \times \tanh\left(\frac{SS - x_{01}}{dx_1 \times q}\right)\right);$$

where the function will have values between 0 and $f1_{max}$, $x_{01}$ and $dx_1$ are parameters that define the inclination of the linear part of the function and its center coordinates. Examples on typical values of the parameters $x_{01}$ and $dx_1$ are 80 dBm and $a/\bar{q}$, respectively, where $\bar{q}$ is the average value of all elements except the diagonal in the $Q_n$ matrix and a is the desired span of the function. A suitable value can e.g. be 5 which leads to that said function has a minimum value of −2.5 and a maximum value of +2.5.

All five above-mentioned quotients give a functional value of $f_1$, which values are summed and the sum obtained is multiplied by a standardization factor that is equal to 1/(the number of terms in the sum). This can be summarized by the following expression:

$$\frac{1}{5} \times \sum_{i=3}^{7} f_1\left(\frac{SS_i}{q_{i1}}\right).$$

In order to get a well defined and controllable area within which the above mentioned summation and standardization correspond to a value, said handover value, e.g. the same saturation function as above is used which gives:

$$\text{handover value} = \left(\frac{1}{2} + \frac{1}{2} \times \tanh\left(\frac{\left(\frac{1}{5} \times \sum_{i=3}^{7} f_1\left(\frac{SS_i}{q_{i1}}\right)\right) - x_{02}}{dx_2}\right)\right) \times f2_{max};$$

where the function will have values between 0 and $f2_{max}$, $x_{02}$ and $dx_2$ are parameters that define the inclination for the linear part of the function and its center coordinates. Examples on typical values of the parameters $f2_{max}$, $x_{01}$ and $dx_1$ are 3–6, 0.5 and 1, respectively.

When a mobile terminal is present in a cell k that has a corresponding radio base station k and n neighbouring cells having n radio base stations in the neighbouring cell list and wishes to compare measured signal strength from the radio base station k (active cell) with a measured signal strength from a radio base station j which possibly can be a handover candidate, the following comparison is carried out: $SS_j \geq SS_k + hyst_1 +$ handover value, where the handover value is calculated in accordance with:

$$\Lambda = \sum_{i=1}^{n} f_1\left(\frac{SS_i}{q_{ij}}\right), \quad (1)$$

where i≠k and i≠j and f1 are defined as above.

$$\text{handover value} = \left(\frac{1}{2} + \frac{1}{2} \times \tanh\left(\frac{\frac{1}{n-1} \times \Lambda - x_{02}}{dx_2}\right)\right) \times f2_{\max}, \quad (2)$$

where f2max, x02 and dx2 are defined as above.

Figure 3:
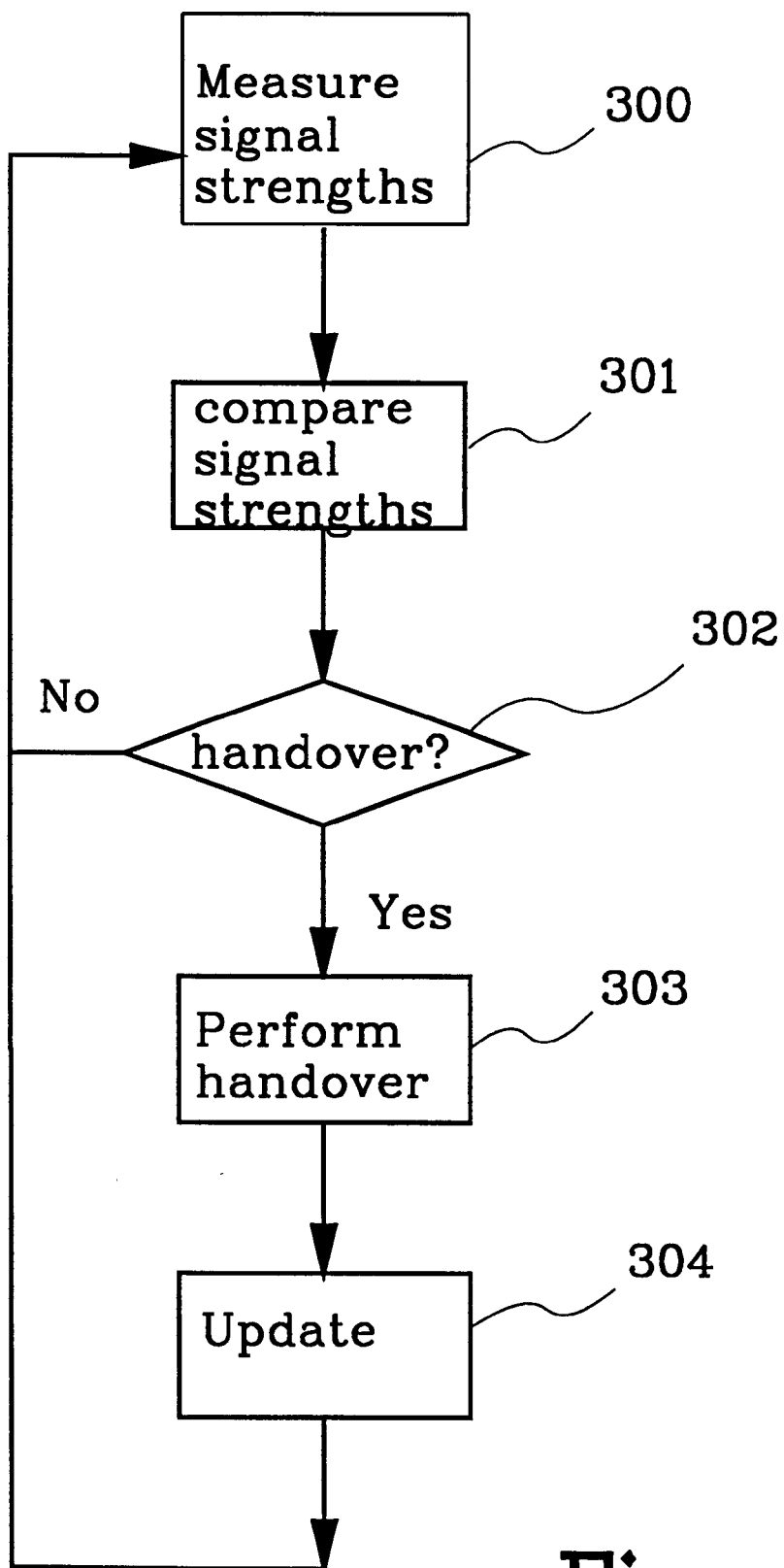
FIG. 3 shows a flowchart for a handover.

FIG. 3 is a flow chart which illustrates one embodiment of a handover method. When a call is set up between the mobile terminal 101 and the radio base station RBS2, in a step 300, all signal strengths are measured between the mobile terminal 101 and the radio base stations RBS1, RBS3, RBS4, RBS5, RBS6 and RBS7 of the neighbouring cells of its active cell and between the radio base station RBS2 and the mobile terminal 101 wherein the signal strengths $SS_{C1}$, $SS_{C2}$, $SS_{C3}$, $SS_{C4}$, $SS_{C5}$, $SS_{C6}$ and $SS_{C7}$ are obtained. The signal strength $SS_{C1}$, $SS_{C3}$, $SS_{C4}$, $SS_{C5}$, $SS_{C6}$ and $SS_{C7}$ of all neighbouring cells are compared with the signal strength $SS_{C2}$ from the radio base station of the active cell in a step 301 in accordance with the principle explained above. In a step 302, it is checked whether any of the conditions is fulfilled. In accordance with an alternative "no", no handover is performed and a new signal strength measurement is carried out in step 300 after that a predetermined time interval has elapsed. In a step 303, handover is performed in accordance with a known method to a new radio base station or a new cell and in a step 304, the mobile radio system and the mobile terminal 101 are updated. The mobile terminal will e.g. get a new neighbouring cell list. When a handover has been carried out, also the value of the relation value is updated in the mobile radio system, in which value the handover just performed, is included.

The method can also be used when the mobile telephone is in "idle mode", i.e. switched on and in contact with a mobile radio system but not set up for a call. Then, the mobile terminal has information about which cell it prefers.

The method in accordance with the invention can also be used in mobile radio systems designed with CDMA technology (Code Division Multiple Access). Each mobile terminal is set up to one or more radio base stations. These radio base stations are denoted actively set in a CDMA system. The method according to the invention is thus applicable when choosing which radio base stations are to be included in the active set of a mobile terminal.

Of course, the invention is not restricted to the embodiments described above and illustrated on the drawing but can be modified within the scope of the appended claims.

What is claimed is:

1. A method of handover in a mobile radio system having radio base stations with associated cells, and at least one mobile terminal, comprising the steps of:
   measuring a signal strength measure of radio signals transferred between at least some of the radio base stations and the mobile terminal,
   performing a handover of the mobile terminal from a first radio base station to a second radio base station, and
   wherein said handover is performed using a handover value that depends on a sum of quotients
      where the numerator in a respective quotient is formed by said signal strength measure from a radio base station in question whose associated cell is a neighboring cell to a cell of the first radio base station and where the denominator in the respective quotient is formed by a relation value between the second radio base station and the radio base station in question, said relation value being essentially independent of said signal strength measure.

2. The method according to claim 1, wherein said handover value is formed by another method comprising the steps of:
   generating quotients between at least one measured signal strength and each of a respective relation-value,
   transforming each quotient to a corresponding value within a defined first area by using a first saturation function,
   summing the transformed quotients whereby a sum is obtained,
   generating a first standardized value by multiplying said sum by a predetermined factor, and
   transforming said first standardized value to said handover value within a defined second area by using a second saturation function.

3. The method according to claim 2, wherein the defined first area for said first saturation function is independent of which radio base station in the mobile radio system is the first radio base station.

4. The method according to claim 2, wherein the defined first area for said first saturation function is dependent on which radio base station in the mobile radio system is the first radio base station.

5. The method according to claim 2, wherein said first saturation function is a first tangent hyperbolicus function.

6. The method according to claim 2, wherein said predetermined factor is inversely proportional to the number of generated quotients.

7. The method according to claim 2, wherein the defined second area for said second saturation function is independent of which radio base station in the mobile radio system is the first radio base station.

8. The method according to claim 2, wherein the defined second area for said second saturation function is dependent on which radio base station in the mobile radio system is the first radio base station.

9. The method according to claim 2, wherein said second saturation function is a second tangent hyperbolicus function.

10. A system for mobile radio with radio base stations, having associated cells, and a mobile terminal, the system comprising:
   measurement means adapted to measure a signal strength of radio signals transmitted between at least some of the radio base stations and the mobile terminal,
   handover means adapted to perform handover of the mobile terminal from a first radio base station to a second radio base station,
   storage means adapted to store relation values between at least some of said cells,
   calculating means adapted to form a handover value which is dependent on said signal strength and said relation values,
   wherein said handover means is adapted to perform handover utilizing said handover value, and
   wherein said calculating means is adapted to form said handover value utilizing a sum of quotients
      wherein a respective quotient is formed by said signal strength from a radio base station in question whose associated cell is a neighboring cell to a cell of the first radio base station, and the relation value between the second radio base station and the radio base station in question.

11. The system according to claim 10, wherein said calculating means further comprises:

means to generate quotients between at least one signal strength and each of a respective relation value, means to transform each quotient into a corresponding value within a defined first area by means of a first saturation function, means to sum the transformed quotients to obtain a sum, means to generate a first standardized value by multiplying said sum by a predetermined factor, and means to transform said first standardized value to said handover value within a defined second area by means of a second saturation function.

12. The system according to claim 11, wherein the defined first area for said first saturation function is independent of which radio base station in the mobile radio system is a first radio base station.

13. The system according to claim 11, wherein the defined first area for said first saturation function is dependent on which radio base station in the mobile radio system is the first radio base station.

14. The system according to claim 11, wherein said first saturation function is a first tangent hyperbolicus function.

15. The system according to claim 11, wherein said predetermined factor is inversely proportional to the number of generated quotients.

16. The system according to claim 11, wherein the defined second area for said second saturation function is independent of which radio base station in the mobile radio system is the first radio base station.

17. The system according to claim 11, wherein the defined second area for said second saturation function is dependent on which radio base station in the mobile radio system is the first radio base station.

18. The system according to claim 11, wherein said second saturation function is a second tangent hyperbolic function.

* * * * *